United States Patent [19]

Webb

[11] Patent Number: 5,009,785
[45] Date of Patent: Apr. 23, 1991

[54] SYSTEM AND APPARATUS FOR THE SEPARATION OF MULTI-PHASE MIXTURE

[75] Inventor: David A. Webb, Northcote, Australia

[73] Assignee: Conoco Specialty Products Inc., Houston, Tex.

[21] Appl. No.: 310,279

[22] Filed: Feb. 13, 1989

Related U.S. Application Data

[63] Continuation-in-part of Ser. No. 6,558, Feb. 20, 1987, abandoned.

[30] Foreign Application Priority Data

Apr. 23, 1985 [AU] Australia .............. PH0274
Apr. 23, 1986 [AU] Australia ............. PCT/AU86/00111

[51] Int. Cl.⁵ .............................................. B04C 7/00
[52] U.S. Cl. ................... 210/512.2; 55/344; 55/349; 209/144; 209/211
[58] Field of Search ............... 210/512.1, 512.2, 512.3, 210/788, 787, 456; 55/349, 346, 348, 459.1, 344, 345; 209/211, 144

[56] References Cited

U.S. PATENT DOCUMENTS

| | | | |
|---|---|---|---|
| 2,622,735 | 12/1952 | Criner | 209/211 |
| 2,754,968 | 7/1956 | Vegter et al. | 210/788 |
| 3,057,746 | 10/1962 | Gilbert | 209/211 |
| 3,371,794 | 3/1968 | Johnson | 209/211 |
| 3,543,931 | 12/1970 | Rastatter | 210/512.2 |
| 4,208,270 | 6/1980 | Grieve et al. | 210/512.2 |
| 4,210,430 | 7/1980 | Galow | 55/344 |
| 4,350,596 | 9/1982 | Kennedy, Jr. | 210/512.2 |
| 4,389,307 | 6/1983 | Boadway | 210/512.2 |
| 4,430,100 | 2/1984 | Cardo | 55/344 |
| 4,585,466 | 4/1986 | Syred et al. | 210/512.2 |
| 4,650,584 | 3/1987 | Macierewicz | 210/512.2 |

FOREIGN PATENT DOCUMENTS

| | | | |
|---|---|---|---|
| 137231 | 5/1950 | Australia | 55/344 |
| 0733738 | 5/1980 | U.S.S.R. | 210/512.2 |

Primary Examiner—Richard V. Fisher
Assistant Examiner—Joseph Drodge
Attorney, Agent, or Firm—John E. Holder

[57] ABSTRACT

Apparatus for separating multi-phase liquid mixtures or at least partially separating a more dense liquid component of the mixture from a less dense liquid component thereof. An outer casing has a cavity therein, an intake port through which the mixture is fed to the apparatus, a first outlet port from which the less dense liquid component is discharged and a second outlet port from which the more dense liquid component is discharged. A cyclone separator is located within the cavity and has a plurality of separating chambers, each chamber having a primary portion which has a greater cross-sectional dimension at one end than at its other end and having a feed inlet, an overflow outlet at the end of the separating chamber of greater cross sectional dimension and an under flow outlet at the other end, and a closure for one end of the cavity. The underflow outlets of the separating chambers communicate with the cavity so that the more dense component of the mixture passes into the cavity to be discharged through the second outlet port, and the overflow outlet from each separator chamber leads to an overflow outlet passage at least partially formed by the closure and then to the first outlet port, the overflow outlet passage being disposed between the intake port and the second outlet port.

16 Claims, 7 Drawing Sheets

SYSTEM AND APPARATUS FOR THE SEPARATION OF MULTI-PHASE MIXTURE

This is a continuation-in-part of co-pending U.S. Appln. Ser. No. 006,558, filed Feb. 20, 1987 now abandoned.

This invention relates generally to the separation of multi-phase mixtures and more particularly though not exclusively, to the separation of oil/water mixtures.

Multiple hydrocyclone apparatus are known where the separated mixtures from a plurality of hydrocyclones are collected separate zones and then discharged through two outlet ports one for one the separated mixtures and the other for the other separated mixture.

U.S. Ser. No. 3,386,588 to ADES discloses a coolant filter in which a plurality of separator units are mounted within a casing. The coolant enters an intermediate chamber within the casing and is delivered to the separator units. The filtered coolant passes through the separator units and is passed into a lower chamber in the casing from where it is discharged via an outlet port in its lower wall. The contaminant particles pass into an upper chamber from where they are discharged through an upper outlet port. This apparatus is not suitable for the separation of multi-phase liquid mixtures and suffers from the problem that access to the inlets to the separator units is difficult because of the position of the chamber for the receiving contaminants and the disposition of the upper outlet port.

U.S. Pat. Nos. 2,754,968 to VEGTER et al and 2,765,918 to FONTEIN et al both describe multiple hydrocyclone apparatus. Both specifications however disclose an arrangement where one of the outlets for the material discharged from the hydrocyclones is disposed above the inlet with the discharged material being first delivered to a relatively large volume collection chamber. Thus, the problems of access to the inlets is also a problem here. Furthermore, neither specification is directed to the specific application of mult-phase liquid separation.

According to the present invention there is provided apparatus for separating multi-phase liquid mixtures or at least partially separating a more dense liquid component of the mixture from a less dense liquid component thereof, comprising an outer casing having a cavity therein such as a more dense water phase or component from a less dense oil phase or component, an intake port through which, in use, the mixture is fed to the apparatus, a first outlet port from which the less dense liquid component can be discharged from the apparatus and a second outlet port which the more dense liquid component can be discharged from the apparatus, the apparatus further including a cyclone separating means located within said cavity and which comprises a plurality of separating chambers, each chamber having a primary portion which has a greater cross-sectional dimension at one end than at its other end and comprising a feed inlet, an overflow outlet at said one end of the separating chamber of greater cross sectional dimension and an under flow outlet at the other end, closure means extending transversely across the casing in sealing relationship with the wall thereof forming a closure for one end of the cavity, the underflow outlets of the separating chambers communicating with the cavity so that the more dense component of the mixture can pass into the cavity to be discharged through the second outlet port, and the overflow outlet from each separator chamber leading to an overflow outlet passage at least partially formed by said closure means and thence to the first outlet port, said overflow outlet passage being disposed between the intake port and the second outlet port.

Preferably the closure means comprises a first part in the form of a plug-like member and a second part disposed adjacent to the first part on side thereof remote from said cavity. The second part includes a major inlet passage in fluid communication with the intake port of the apparatus and a plurality of individual preferably tangentially directed feed inlets communicating with the major inlet passage for directing liquid to respective ones of the separating chambers.

Preferably the feed inlets to the separating chambers are of involute form. The outer casing of the apparatus may be in the form of an elongate tubular member having its ends closed by end plugs or caps.

Preferably the intake port is disposed adjacent the second port of the closure means. The second outlet port is preferably spaced from the closure menas and the first outlet port in a position at a level between the intake port and the second outlet port.

The overflow outlet passage for discharge of the less dense component through the first outlet port, may comprise a groove in the outer surface of the plug-like member. Collecting passages may be provided for receiving the separated component from the overflow end of each separating chamber and transferring it to the overflow outlet passage. Preferably the plug-like member has a tapered forward end which seats in a complementary tapered portion on the outer casing with the groove being provided on a tapered portion.

Preferred embodiments of the invention will hereinafter be described with reference to the accompanying drawings and in those drawings.

Referring to the drawings, the apparatus generally indicated at 1 comprises an outer casing 2 having a cavity 4 therein. An intake port 20 is provided through which, in use, the mixture is fed to the apparatus, there further being a first outlet port 21 from which a less dense component can be discharged from the apparatus and a second outlet port 22 from which a more dense component can be discharged from the apparatus. The apparatus further includes a cyclone separating device 40 which comprises a plurality of chambers 42 each chamber having a primary portion which has a greater cross sectional diameter at one end than at its other end and further having an overflow outlet 45 at one end thereof, and an underflow outlet 46 at the other end thereof.

The separating device further includes a closure means 44 which includes a first part in the form of a plug-like element 44b and a second part 44a. The second part 44a is operatively connected to or formed integral with the overflow outlet end of each of the separating chambers 42. The second part 44a includes a major inlet passage 48 in fluid communication with the intake port of the apparatus and a plurality of tangentially directed feed inlets 50, communicating with the major inlet passage 48 and directing fluid to a respective one of the separating chambers, the underflow outlets 46 being in communication with the cavity 4, so that the more dense component can pass into the cavity and then be dishcarged through the second outlet port 22. Cyclone separating device 40 extends through the plug-like element 44b of the closure means. The chambers 42 may be partially defined apertures in the plug-like element 44b.

As shown, where four separating chambers are provided, four feed inlets 50 are provided and desirably these feed inlets 50 are of involute form.

As shown the outer casing 2 comprises an elongate tubular member 6, having its ends closed by suitably fitting plugs or caps 10 and 11.

The intake port 20 may be in the form of an intake pipe at towards one end of the elongate tube 6 and the second outlet port 22 for discharge of the more dense component of the mixture may be in the form of a pipe also towards the aforementioned one end or spaced therefrom. Preferably the first outlet port 21, from which the less dense component is discharged from the apparatus is also disposed at the aforementioned one end.

The first part and second part of the closure means 44 further includes collection passages 51, 52, 53 for collection of the less dense component (e.g. the oil) from the overflow outlets of the separating chambers 42. The collection passage 53 leads into an overflow outlet passage in the form of an annular groove 54 in the outer surface of the plug-like element 44b through passage 53a from which the less dense component is discharged through first outlet port 21. The annular groove 54 is disposed near the end of the plug-like element 44b, adjacent the cavity. Although, as shown the overflow outlets of the separating chambers 42 feed into common passages 52, 53, a number of collecting passages may also be provided for receiving the separated component from the overflow end of each chamber and transferring it to the overflow outlet passage which as shown is in the form of groove 54.

As shown the plug-like element 44b has a tapered forward end 66 which is adapted to seat in a complementary tapered portion 67 on the outer casing 2. Preferably the annular groove 54 is provided on this tapered portion and suitable sealing means such as O-rings 47a and 47b are disposed on either side of the groove 54. As the groove 54 is disposed at the forward end of the block like element 44b, the pressure of the incoming mixture into the head portion 44a, tends to force the tapering sides together to assist in sealing of the plug-like element 44b against the casing 2.

Figure 9:
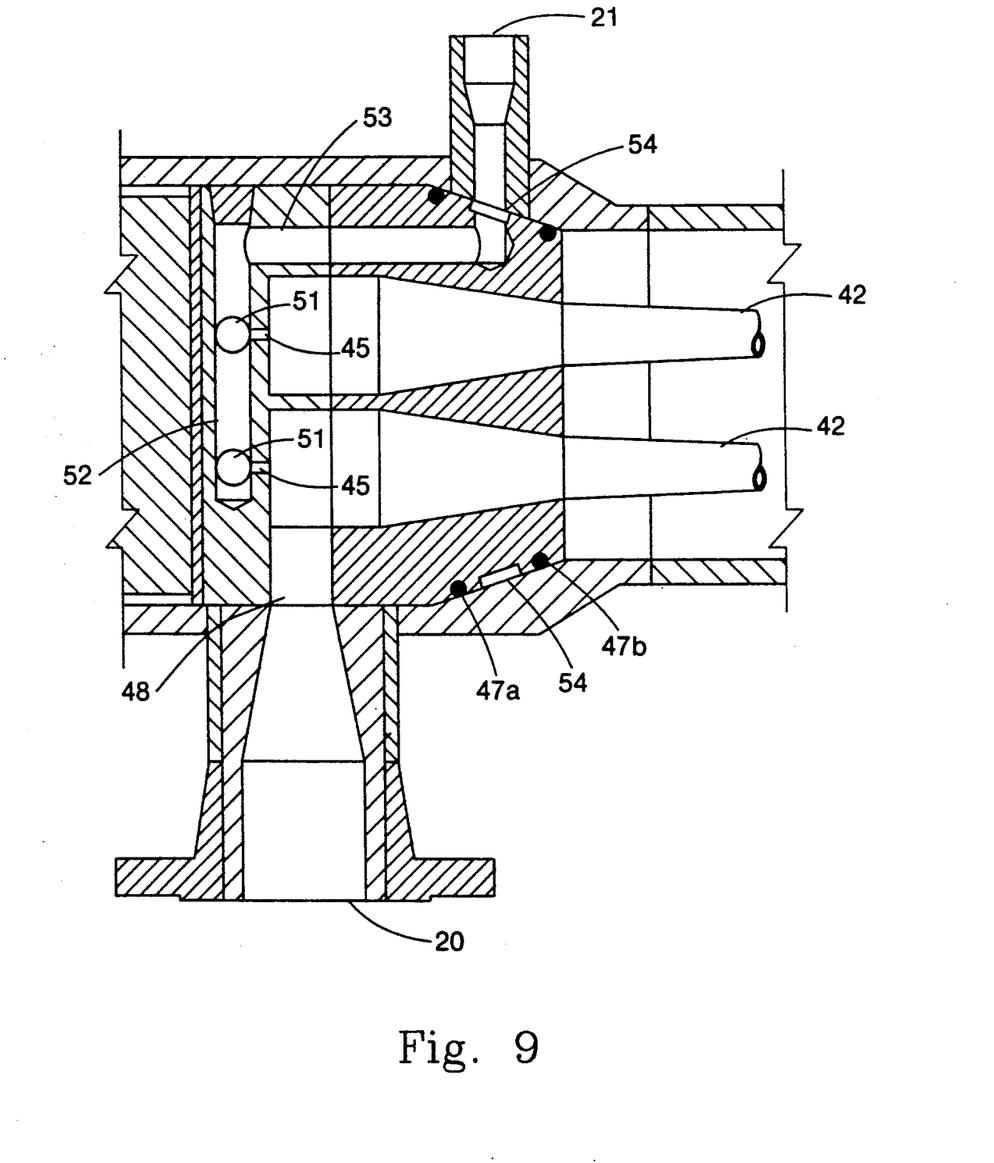
FIG. 9 is a schematic view of part of the apparatus which shows in more detail the arrangement of the various passages in the closure means. It should be noted that this view is not of the apparatus shown in the earlier drawings.

The arrangement of the various passages within the closure means 44 is best understood by reference to FIG. 9 which is a schematic representation of part of apparatus according to the present invention. It should be noted that FIG. 9 is not directly related to the embodiment as shown in FIGS. 1 to 7 although like parts have been given the same reference numerals. The purpose of FIG. 9 is simply to illustrate the arrangement of the various passages and when this figure is taken in conjunction with FIG. 5 the overall arrangement will become readily understood.

With reference to FIG. 9, the mixture to be separated enters via intake port 20 into the major inlet passage 48 from which the mixture feeds into the four cyclone separators 42 via the four inlets 50. In FIG. 9, the major inlet passage 48 can not be seen entering the cyclone separator 42 at the top of the drawing because entry is effected on the back. Separation takes place in the separating chambers 42 and the less dence mixture (i.e. the oil) is discharged through the overflow outlet 45. The discharge mixture passes from overflow outlet 45 into one of the collecting passages 51 associated with a respective separating chamber 42. The mixture passes from the collection passages 51 into a major collection passage 52 from where it is fed to collection passage 53 from which is passes along and into the overflow passage 54. The overflow passage 54 is in the form of an annular groove in the side face of the plug-like element 44B. The mixture than passes along the annular groove 54 which defines the overflow outlet passage and out of the apparatus via outlet port 21

Figure 1:
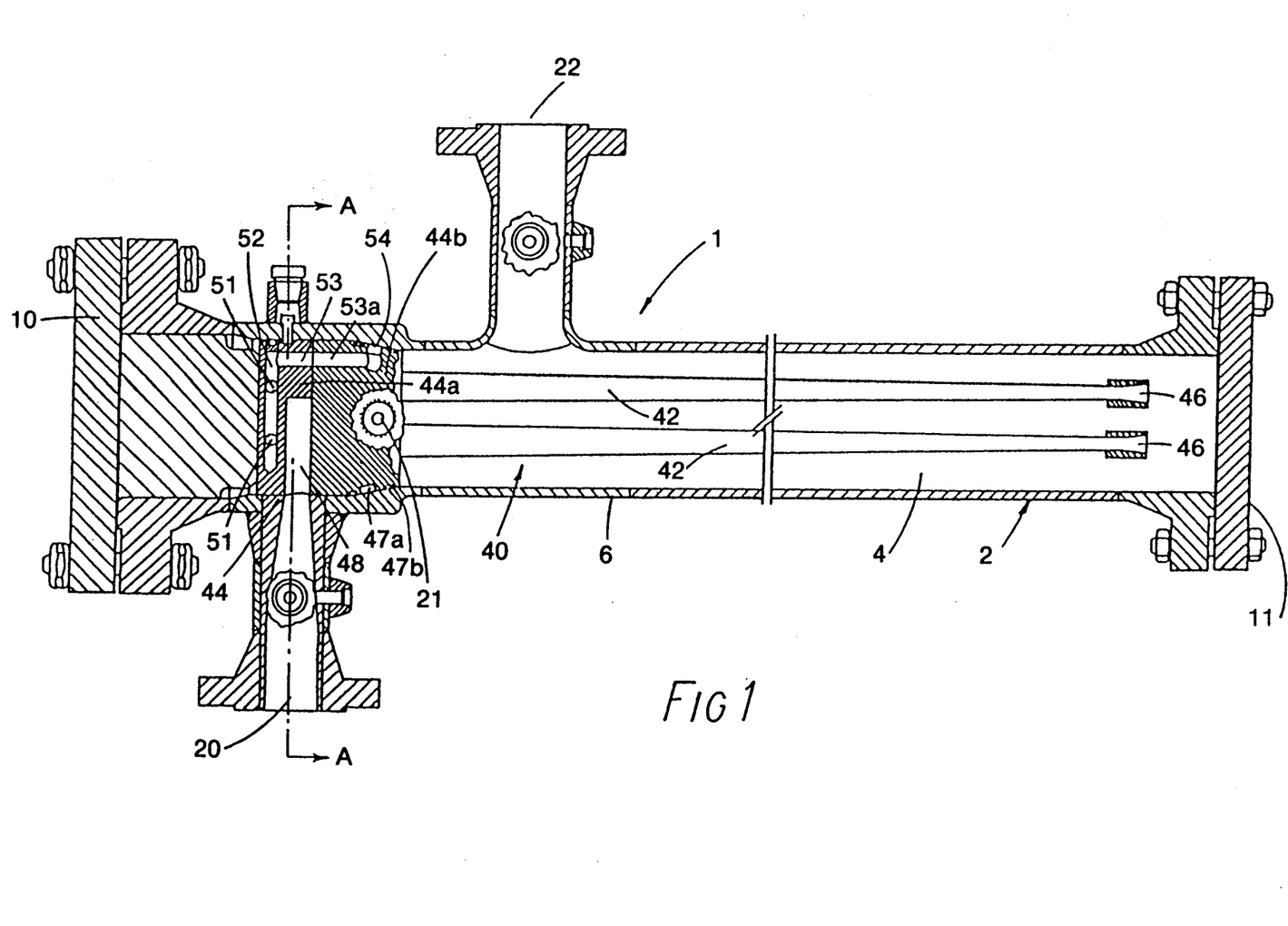
FIG. 1 is a sectional side elevation of the apparatus according to the present invention.
Figure 2:
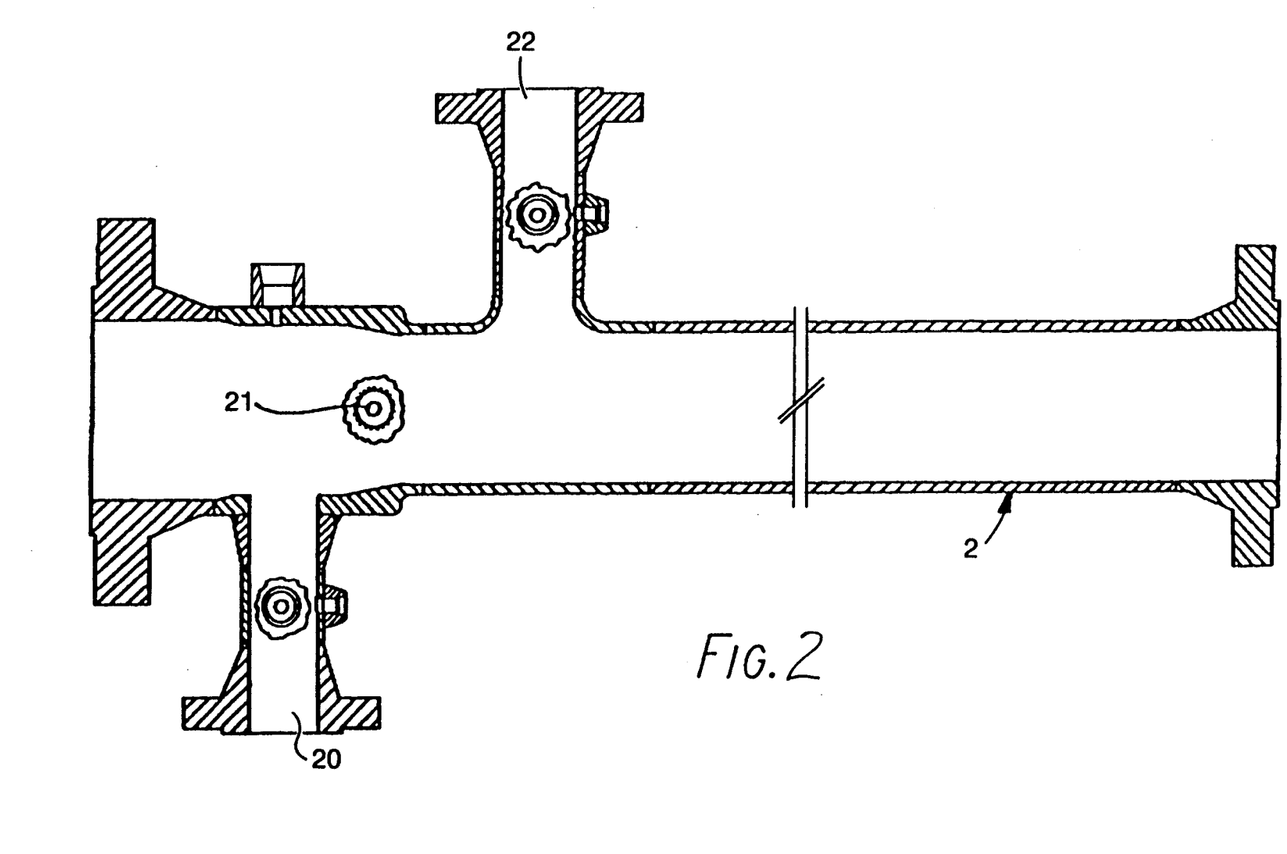
FIG. 2 is a sectional side elevation of the outer casing of the apparatus according to the present invention.
Figure 3:
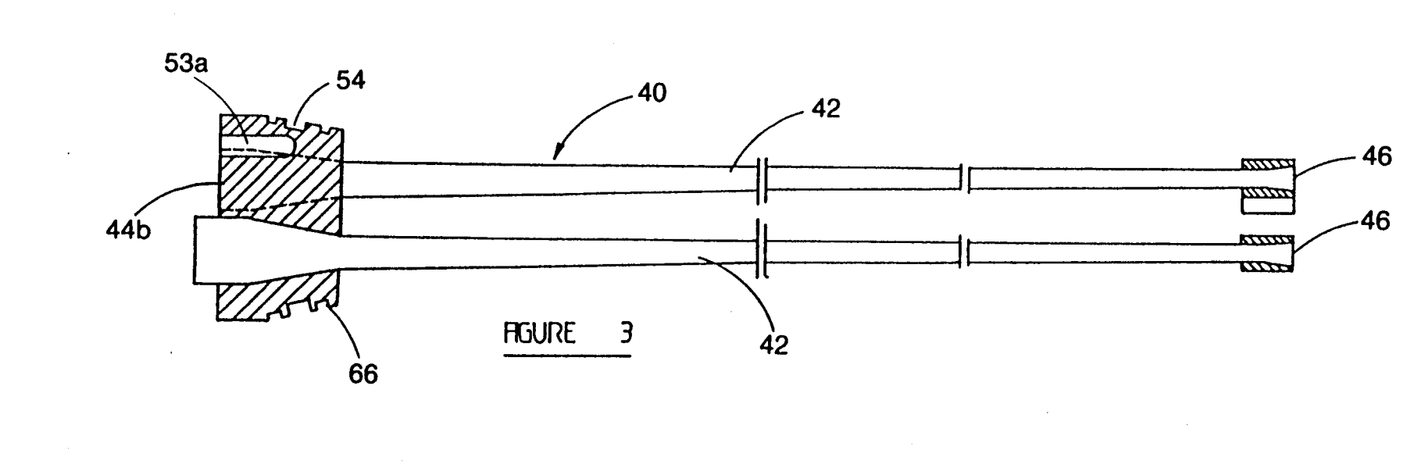
FIG. 3 is a sectional side elevation of the plug-like element and cyclone separating device.
Figure 4:
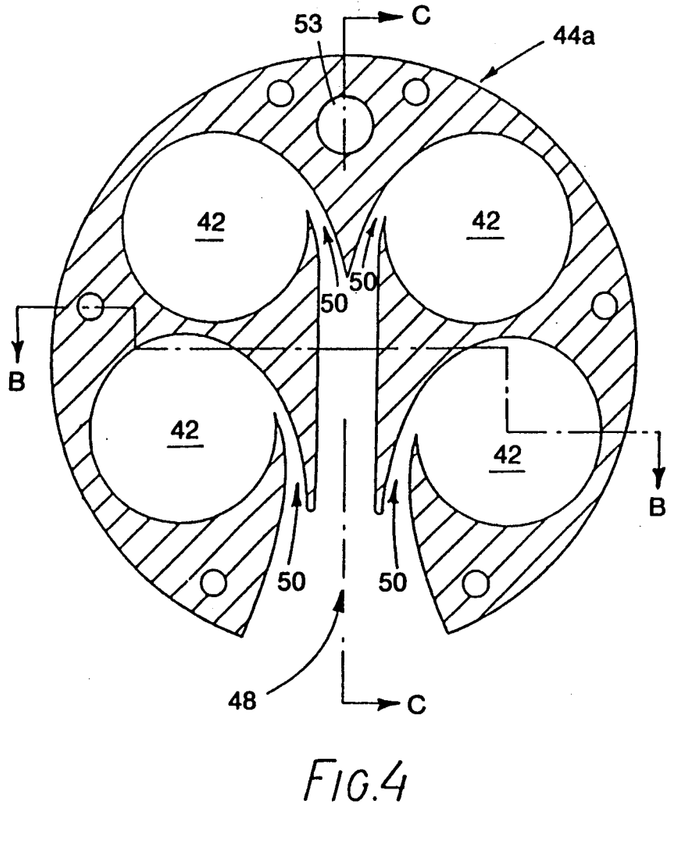
FIG. 4 is a sectional view of the closure means of the apparatus on line A—A in FIG. 1.
Figure 5:
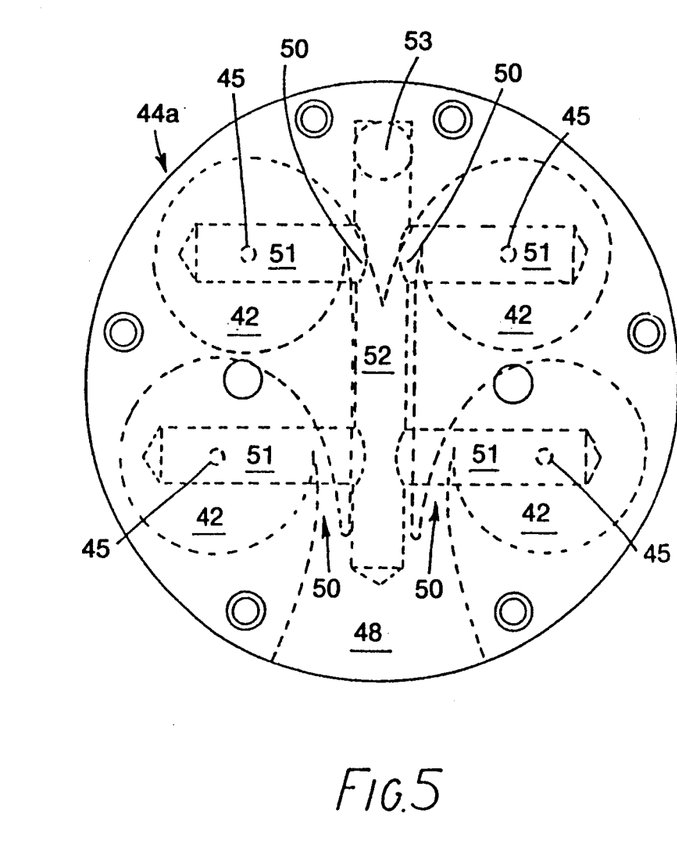
FIG. 5 is a top plan view of the closure means of the apparatus.
Figure 6:
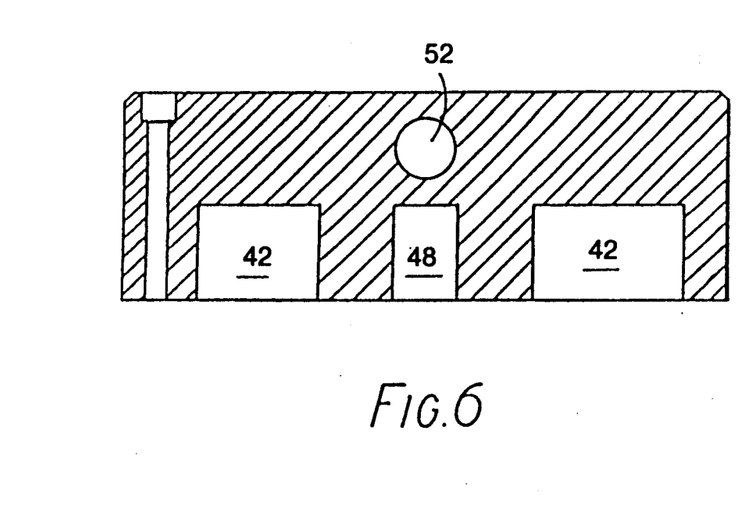
FIG. 6 is a section on line B—B of FIG. 4.
Figure 7:
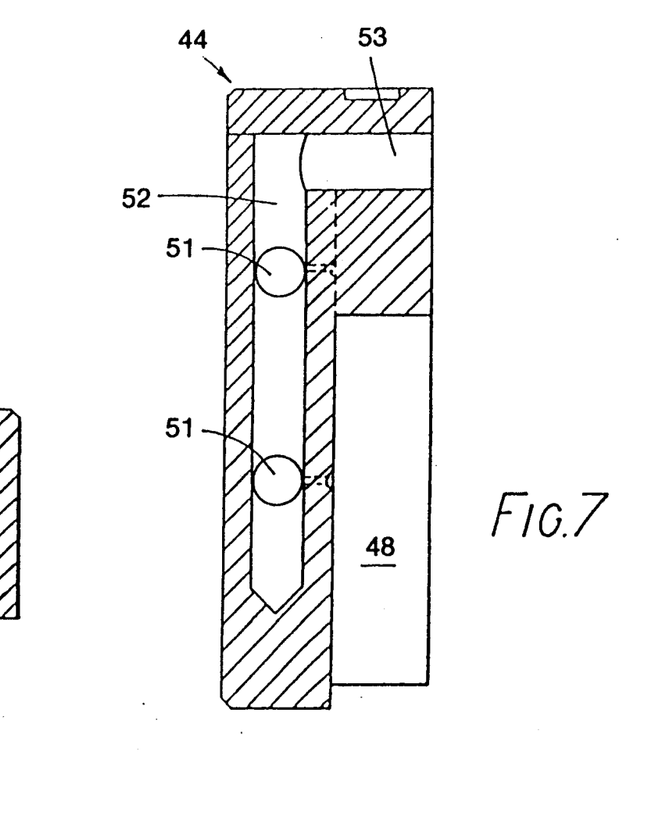
FIG. 7 is a section on line C—C of FIG. 4.
Figure 8:
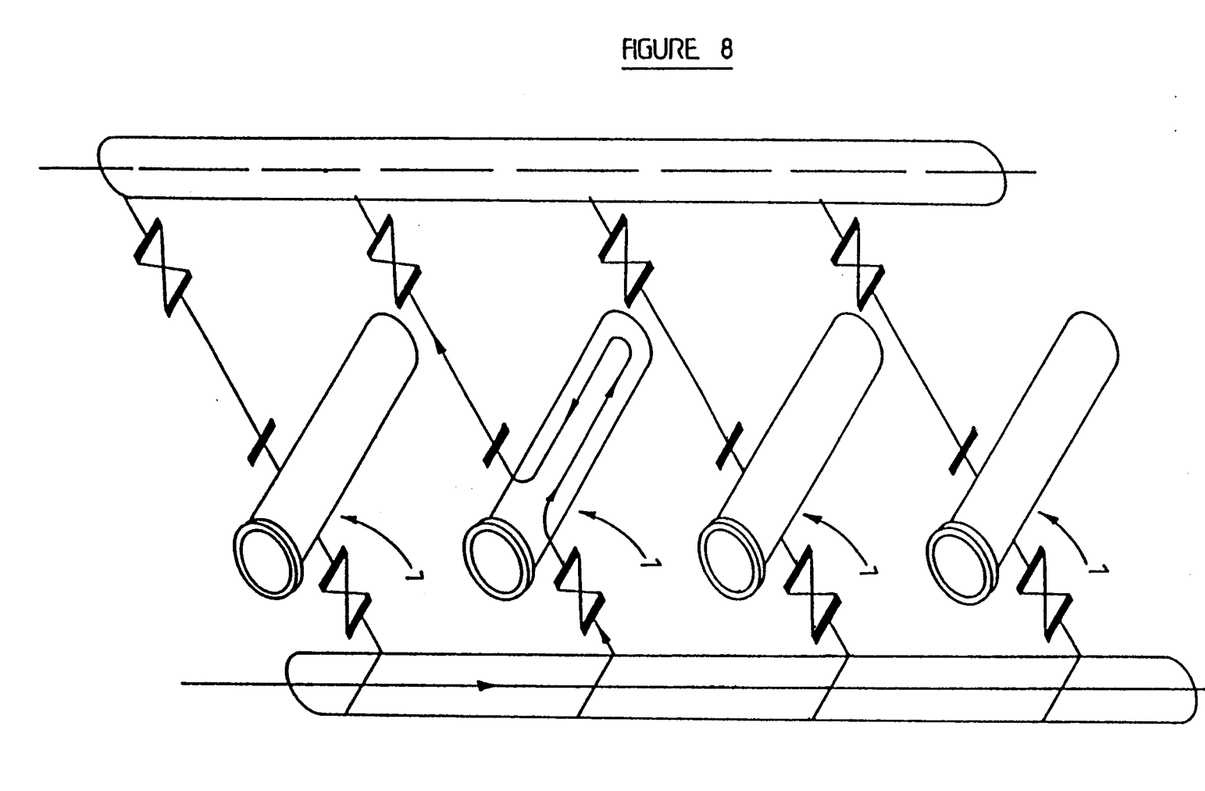
FIG. 8 is a schematic view of a system according to the invention.

As shown in FIG. 8, a system for separating multi-phase mixtures comprising an input line through which the multi-phase mixture is delivered, an output line through which at least one of the separated phases of the mixture is discharged and a plurality of apparatus as described above arranged in pararllel between the input and output lines.

Preferably, valve means interconnected with said apparatus and said input and output lines, as shown in FIG. 8, is provided so that each apparatus can be made selectively operable or inoperable.

The claims defining the invention are as follows:

1. Apparatus for separating multi-phase mixtures or at least partially separating a more dense component of a mixture from a less dense component thereof, the apparatus comprising; an outer casing defining a cavity therein, an intake port through which the mixture is fed to the apparatus, a first outlet port from which a more dense component can be discharged from the apparatus and a second outlet port from which a less dense component can be discharged from the apparatus; the apparatus further including a cyclone separating means locatable within said cavity and which comprises a plurality of longitudinal separating chambers, each chamber having a portion which has a greater cross-sectional dimension at one end than at its other end, each chamber further comprising inlet means and at least two outlets; a head portion integrally connected to each of said separating chambers and having a first outlet passage formed within the head portion and transverse to said longitudinal separating chambers in fluid communication with one outlet of each of said separating chambers and a second outlet passage within said head portion which is parallel with said longitudinal separating chambers; and means for communicating said first and second outlet passages with said second outlet port, the other of said outlets of each separating chamber being in communication with said first outlet port, at least a portion of one of said outlet passages being located at a position between said intake port and said first outlet port.

2. Apparatus according to claim 1 wherein one of said outlets comprises an overflow outlet at the end of the separating chamber of greater cross sectional dimension and the other said outlets comprises an under flow outlet positioned longitudinally away from said overflow outlet toward said other end of said separating chamber.

3. Apparatus according to claim 1 wherein said head portion is formed integral with said one end of each of the separating chambers, the head portion including a major inlet passage in fluid communication with the intake port of the apparatus and the plurality of tangentially directed feed inlets communicating with the major inlet passage and directing fluid to respective ones of the separating chambers, the underflow outlets being in communication with the cavity, so that the more dense component can pass into the cavity and then be discharged through the second outlet port.

4. Apparatus according to claim 3 wherein said head portion comprises a major inlet passage in fluid communication with the intake port with the head portion disposed within the cavity.

5. Apparatus according to claim 4 wherein said head portion comprises a blocklike element having said major inlet passage formed therein and a series of tangentially directed feed inlets associated therewith which feed the mixture to respective portions of the separating chambers.

6. Apparatus according to claim 3 and further wherein said head portion comprises a blocklike element having said major inlet passage formed therein and a series of tangentially directed feed inlets associated therewith which feed the mixture to respective separating chambers.

7. Apparatus according to claim 6 wherein at least four separating chambers are provided, each being in fluid communication with at least one said feed inlet which is of involute form.

8. Apparatus according to claim 6 wherein the head portion includes a third outlet passage for discharge of the less dense component through the second outlet port, the third outlet passage comprising a groove in the outer surface of the block like element from which the less dense component is discharged, the third outlet passage being disposed in the blocklike portion, adjacent the separating chambers.

9. Apparatus according to claim 8 wherein the first and second outlet passages include collecting passages for receiving the separated component from the overflow end of each chamber and transferring it to the third outlet passage.

10. Apparatus according to claim 9 wherein the head portion includes a tapered forward end arranged to face the cavity formed within the casing and which is adapted to seat in a complementary tapered portion on the outer casing, the third outlet passage being provided on this tapered forward end.

11. Apparatus according to claim 3 wherein said head portion is arranged to be sealingly received within the cavity and has portions forming a major inlet passage in fluid communication with the intake port with the head portion disposed within the cavity.

12. A system for separating multi-phase mixtures comprising an input line through which the multi-phase mixture is delivered, an output line through which at least one of the separated phases of the mixture is discharged and a plurality of apparatus according to claim 1 arranged in parallel between the input and output lines and, valve means interconnected with said apparatus and said input and output lines 13. An oil-water separating apparatus for at least partially separating a more dense liquid component from a less dense oil component of a multi-phase fluid mixture, comprising:

an outer casing arranged to form a fluid tight cavity;

a plurality of elongated cyclone separation chambers having a central axis, an inlet end and an outlet end and mounted within the cavity, each of said chambers having a portion which has a greater cross-sectional dimension at its inlet end than at its outlet end;

each of said chambers having at least one tangential inlet means at its inlet end and at least two outlets, with one of said outlets being located at or near the inlet end of said chamber for outletting the less dense oil component of the fluid mixture from said chamber and the other of said outlets being located at or near the outlet end of said chamber for outletting the more dense liquid component of the fluid mixture from said chamber;

head means constituting a block and arranged for rigid sealing reception against said outer casing and against the outer peripheral wall of each of said elongated separation chambers at the inlet ends thereof, said head means having an outlet passage means within said head for forming a common fluid communication path with the outlet of each of said chambers which is located at or near the inlet end of said chambers for outletting the less dense oil component of the fluid mixture from said chambers;

first outlet port means in a wall of said outer casing for communicating with the other of said outlets of said chambers for outletting the more dense liquid component;

inlet port means for providing a common fluid communication path with said inlet means of each of said chambers; and second outlet port means in a wall of said outer casing for communicating with said outlet passage within said head means.

14. The apparatus of claim 13 wherein said second outlet port means has an opening positioned on a wall of said outer casing so that when said head means is assembled against said outer casing, said outlet passage within said head means is aligned with said outlet port means opening.

15. The apparatus of claim 13 wherein said outlet passage within said head means has a flowpath portion arranged in a plane substantially perpendicular to the central axis of the elongated separation chambers, which flowpath portion is common to each of said outlets for outletting the less dense phase.

16. The apparatus of claim 13 wherein said head means and plurality of chambers are arranged as a unitary structure so that said individual separation chambers are connected thereto in such a way that when said head means is removed from its sealing reception against said outer casing, said separation chambers remain connected to said head means.

* * * * *

UNITED STATES PATENT AND TRADEMARK OFFICE
CERTIFICATE OF CORRECTION

PATENT NO. : 5,009,785
DATED : April 23, 1991
INVENTOR(S) : David A. Webb

It is certified that error appears in the above-identified patent and that said Letters Patent is hereby corrected as shown below:

Column 1, lines 47 and 48 "such as a more dense water phase or component from a less dense oil phase or component," should be deleted and inserted after "thereof," on line 46.

Column 6, line 4, after "lines" insert --.--.

Signed and Sealed this

Second Day of February, 1993

Attest:

STEPHEN G. KUNIN

Attesting Officer

Acting Commissioner of Patents and Trademarks